United States Patent [19]
Min

[11] Patent Number: 5,734,635
[45] Date of Patent: Mar. 31, 1998

[54] METHOD AND APPARATUS FOR CONTROLLING MOVING DISTANCE OF OPTICAL PICK-UP IN AN OPTICAL DISK SYSTEM

[75] Inventor: Kyoung-Seo Min, Suwon, Rep. of Korea

[73] Assignee: SamSung Electronics Co., Ltd., Suwon, Rep. of Korea

[21] Appl. No.: 715,346

[22] Filed: Sep. 18, 1996

[30] Foreign Application Priority Data

Oct. 28, 1995 [KR] Rep. of Korea ............... 37777/1995

[51] Int. Cl.[6] .................................................. G11B 7/085
[52] U.S. Cl. .................................................. 369/44.28
[58] Field of Search .......................... 369/44.28, 44.29, 369/32, 44.34; 360/78.05

[56] References Cited

U.S. PATENT DOCUMENTS

| | | |
|---|---|---|
| 4,788,421 | 11/1988 | Ogawa et al. |
| 4,939,712 | 7/1990 | Abe et al. |
| 4,949,323 | 8/1990 | Yoshida |
| 4,977,539 | 12/1990 | Lee |
| 5,175,716 | 12/1992 | Min |
| 5,398,221 | 3/1995 | Ogawa ............... 369/44.28 |
| 5,446,713 | 8/1995 | Tateishi ............ 369/44.28 |
| 5,661,705 | 8/1997 | Kunikata et al. ... 369/44.28 |

Primary Examiner—Thang V. Tran
Attorney, Agent, or Firm—Robert E. Bushnell, Esq.

[57] ABSTRACT

A method and apparatus for controlling the moving distance of an optical pick-up includes the steps of taking a first count of the number of pulses of a tracking error signal generated during half a cycle of a photo interrupt signal or a hall effect signal; calculating an aimed distance to move by subtracting the current location of the optical pick-up from the target location thereof; moving the optical pick-up according to the number of pulses of the photo interrupt signal or the hall effect signal indicating the aimed distance to move; taking a second count of the number of pulses of the tracking error signal generated from a moving point to a first inverting point of the photo interrupt signal or the hall effect signal, and further moving the optical pick-up for the number of tracks to compensate for, the number being obtained by subtracting the second number of pulses from the first number of pulses. The access time of the optical disk system is reduced by controlling the moving distance of the optical pick-up with a high accuracy and precision using a tracking error signal and a photo interrupt signal, or the tracking error signal and a hall effect signal.

32 Claims, 5 Drawing Sheets

METHOD AND APPARATUS FOR CONTROLLING MOVING DISTANCE OF OPTICAL PICK-UP IN AN OPTICAL DISK SYSTEM

CLAIM OF PRIORITY

This application make reference to, incorporates the same herein, and claims all benefits accruing under 35 U.S.C §119 from an application entitled METHOD FOR CONTROLLING MOVING DISTANCE OF OPTICAL PICK-UP IN OPTICAL DISK SYSTEM, earlier filed in the Korean Industrial Property Office on 28 Oct. 1995 and assigned Ser. No. 95-37777.

BACKGROUND OF THE INVENTION

The present invention relates to a method and apparatus for controlling the moving distance of an optical pick-up in an optical disk system, and more particularly, to a method and apparatus for controlling the moving distance of an optical pick-up in an optical disk system, which reduces the access time of the optical pick-up.

An optical disk system generally refers to a system employing an optical disk drive such as a CD-ROM drive or a CD player. In this optical disk system, access time is defined as the time required to locate and search data by moving an optical pick-up, an important parameter in determining the operational speed of the system. To reduce this access time, the optical pick-up must move rapidly and the distance, or error, between a post-movement location and a target location must be reduced, as well. The error is usually compensated for by a "track jump". That is, the error is compensated for by moving only an object lens and not the optical pick-up itself. The time required to compensate for an error becomes longer as the error increases, resulting in an increase in access time for a large error.

In a typical optical disk system, there are two methods of controlling the distance that an optical pick-up moves to reduce error: one is to use a tracking error signal output from the optical pick-up and calculate the distance to move the optical pick-up, and the other is to use a photo interrupt signal or a hall effect signal.

An earlier optical disk system includes an optical pick-up for generating an optical signal from a recorded area of an optical disk, a radio frequency amplifier for generating a tracking error signal by amplifying the difference in amplitude between two tracking signals of the optical signal output by the optical pick-up, a microcomputer for controlling the entire operation of an optical disk drive, a comparator for converting the tracking error signal output from the RF amplifier into a tracking rectangular wave signal and for outputting the tracking rectangular wave signal to the microcomputer, a servo signal processor for controlling all of the servos of the optical pick-up in response to signals from the microcomputer and RF amplifier and an optical pick-up driver for driving the optical pick-up according to the control signals from the servo signal processor.

In an optical disk system as described above, a focus servo, a tracking servo, a sled servo and a spindle servo may be used for the optical disk driver. The focus servo controls the optical system of the optical pick-up to focus a laser beam of the optical pick-up onto pits of an optical disk. The tracking servo controls the optical system of the optical pick-up to project a laser beam of the optical pick-tip onto a track. The sled servo controls a sled motor to move the optical pick-up to and from an inner circumference and an outer circumference of the optical disk. The spindle servo controls a spindle motor to rotate the optical disk at a constant linear velocity (CLV). As far as the tracking servo is concerned, the optical system of the optical pick-up is controlled by projecting two laser beams having a phase difference of 180° onto both ends of an intended pit on the optical disk and calculating the difference between the intensities of the reflected light. The light intensity difference indicates the difference between the outputs of two optical sensors, i.e., two photo diodes of the optical pick-up.

The above noted method of controlling the moving distance of the optical pick-up by using the tracking error signal is advantageous in that the moving distance of the optical pick-up can be precisely calculated by counting the number of rectangular wave signals per track. However, when a defect occurs in the information recording area of an optical disk, the relative accuracy and precision of the tracking error signal drops, causing large errors in moving to a target location.

However, a photo interrupt signal or a hall effect signal can be substituted for the tracking error signal to control the moving distance of an optical pick-up. That is, the moving distance of the optical pick-up is calculated by counting the number of pulses of the photo interrupt signal or the hall effect signal.

The hall effect signal has a pulse cycle which is longer than the tracking error signal by several times to several tens of times. With the photo interrupt signal or the hall effect signal, a relatively accurate location control is possible even though a defect may exist on a pit of an optical disk. Since every pulse is counted at its inverting point, a counting error reaches half of a cycle at the worst. An error of less than half of a cycle matters little in a relatively short cycle, such as that of a tracking error signal. However, the error becomes a significant problem in a relative long cycle, such as that of a photo interrupt signal or a hall effect signal. The worse case error of half a cycle occurring with the photo interrupt signal or the hall effect signal having a cycle longer than the tracking error signal by several tens of times causes several tens of tracks that must be jumped. As a result, the time required to compensate for the error increases.

Ogawa, et al., U.S. Pat. No. 4,788,421, entitled Apparatus For Controlling Relate Movement Of An Optical Head To An Optical Disk With Velocity Detection, Abe, et al., U.S. Pat. No. 4,939,712 entitled Multiple Tack And Reversing Address Search Method For Using In A Disk Player System, Yoshida, U.S. Pat. No. 4,949,323 entitled Disk Reproduction Apparatus And Method For High Speed Accessing Of Desired Information Data By Checking Address Data, Lee, U.S. Pat. No. 4,977,539 entitled High-Speed Searching Apparatus and Min, U.S. Pat. No. 5,175,716 entitled Method For Searching A Track At High Speed In An Optical Recording/reproducing Apparatus, each disclose various techniques for controlling the relative movement of optical heads with respect to optical disks in optical disk systems. I have found however that these designs have neglected to adequately consider an indication of tracking error by the optical heads relative to the optical disks while controlling the distance that the optical pickup is being moved.

SUMMARY OF THE INVENTION

It is an object of the present invention to provide an improved disk drive.

It is another object to obtain and apply a reliable representation of tracking error into the control of the movement of an optical head relative to an optical disk.

It is yet another object to provide a method and apparatus for controlling the distance of movement of an optical pick-up by using either a tracking error signal and a photo interrupt signal or the tracking error signal and a hall effect signal.

These and other objects may be attained when controlling the moving distance of an optical pick-up by taking a first count of the number of pulses of a tracking error signal generated during half a cycle of a photo interrupt signal or a hall effect signal calculating an aimed distance to move by subtracting the current location of the optical pick-up from the target location, and moving the optical pick-up according to the number of pulses of the photo interrupt signal or the hall effect signal indicating the aimed distance to move. Then, a second count is taken of the number of pulses of the tracking error signal generated from a moving point to a first inverting point of the photo interrupt signal or the hall effect signal, and the optical pick-up is moved farther in correspondence with the number of tracks to compensate for the error. The number of tracks is obtained by subtracting the second number of pulses from the first number of pulses. Consequently, the access time of the optical disk system can be reduced by controlling the moving distance of the optical pick-up with a high accuracy and precision, using a tracking error signal and a photo interrupt signal or the tracking error signal-and a hall effect signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
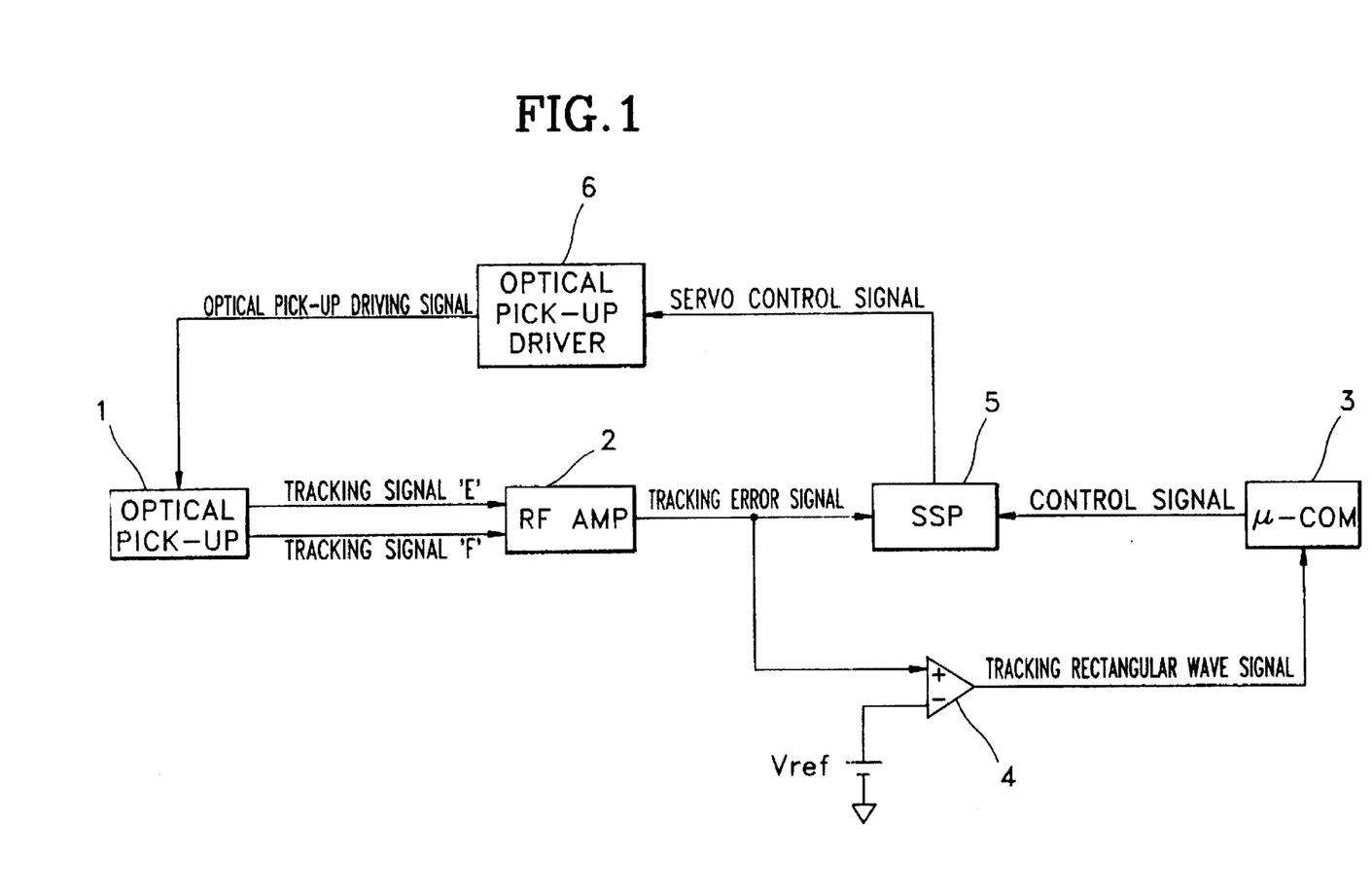
FIG. 1 is a block diagram of a hypothetical representation of an optical disk system, for explaining an earlier method for controlling the moving distance of an optical pick-up.

Turning now to the drawings, FIG. 1 is a block diagram of an earlier optical disk system, for explaining a method of controlling the moving distance of an optical pick-up. As shown in FIG. 1, the optical disk system includes an optical pick-up 1 for generating an optical signal from a recorded area of an optical disk, a radio frequency (RF) amplifier 2 for generating a tracking error signal by amplifying the difference in amplitudes between two tracking signals of the optical signal, a microcomputer 3 for controlling the entire operation of an optical disk drive by firmware, a comparator 4 for converting the tracking error signal into a tracking rectangular wave signal and for outputting the tracking rectangular wave signal to the microcomputer 3, a servo signal processor 5 for controlling all servos of the optical pick-up 1, and an optical pick-up driver 6 for driving the optical pick-up 1 according to a control signal from the servo signal processor 5.

In an optical disk system as described above, a focus servo, a tracking servo, a sled servo and a spindle servo may be used for the optical disk driver. The focus servo controls the optical system of the optical pick-up to focus a laser beam of the optical pick-up onto pits of an optical disk. The tracking servo controls the optical system of the optical pick-up to project a laser beam of the optical pick-up onto a track. The sled servo controls a sled motor to move the optical pick-up to and from an inner circumference and an outer circumference of the optical disk. The spindle servo controls a spindle motor to rotate the optical disk at a constant linear velocity (CLV). As far as the tracking servo is concerned, the optical system of the optical pick-up is controlled by projecting two laser beams having a phase difference of 180° onto both ends of an intended pit on the optical disk and calculating the difference between the intensities of the reflected light. The light intensity difference indicates the difference between the outputs of two optical sensors, i.e., two photo diodes of the optical pick-up.

In FIG. 1, the RF amplifier 2 receives a first tracking signal E and a second tracking signal F from two optical sensors of the optical pick-up 1. The RF amplifier 2 amplifies the difference in amplitudes of the tracking signals E and F, and generates a tracking error signal. The comparator 4 converts the tracking error signal into a tracking rectangular wave signal and outputs the tracking rectangular wave signal to the microcomputer 3. This enables the microcomputer 3 to control the servo signal processor 5. The servo signal processor 5 generates a servo control signal, thus controlling the optical pick-up driver 6. Then, the optical pick-up driver 6 generates an optical pick-up drive signal and drives the optical pick-up 1.

Figure 2:
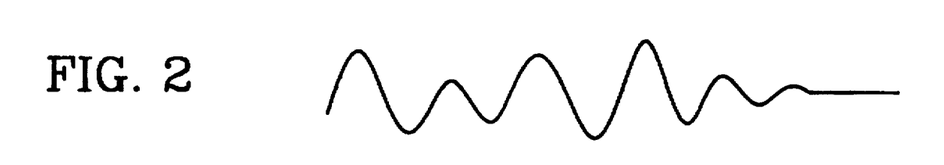
FIG. 2 illustrates the tracking error signal generated by the radio frequency amplifier of FIG. 1.
Figure 3:
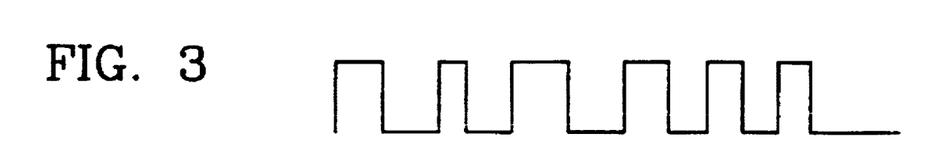
FIG. 3 illustrates the tracking rectangular wave signal generated by the comparator shown in FIG. 1.

FIG. 2 illustrates the tracking error signal generated by the RF amplifier 2 of FIG. 1. FIG. 3 illustrates the tracking rectangular wave signal generated by the comparator 4 of FIG. 1. The microcomputer 3 counts the tracking rectangular wave signal shown in FIG. 3 and calculates the moving distance of the pick-up 1. The microcomputer 3 transmits a control signal indicating the difference between the calculated distance that the optical pick-up 1 moved and an aimed distance to the servo signal processor 5. The servo signal processor 5 generates a corresponding servo control signal.

The above noted method of controlling the moving distance of the optical pick-up 1 by using the tracking error signal is advantageous in that the moving distance of the optical pick-up 1 can be precisely calculated by counting the number of rectangular wave signals per track. When a defect occurs in the information recording area of an optical disk, i.e., on a pit, I have found that the relative accuracy and precision of the tracking error signal drops, causing larger errors in moving to a target location.

A photo interrupt signal or a hall effect signal however can be substituted for the tracking error signal to control the moving distance of an optical pick-up. That is, the moving distance of the optical pick-up is calculated by counting the number of pulses of the photo interrupt signal or the hall effect signal.

Figure 4A:
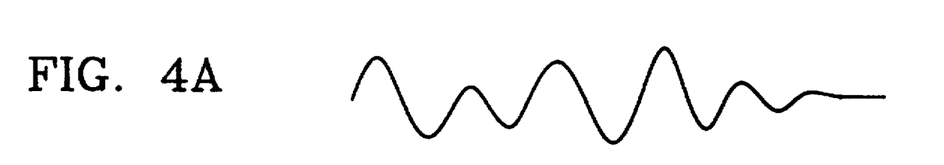
FIG. 4A illustrates the tracking error signal generated by the radio frequency amplifier of FIG. 1.
Figure 4B:
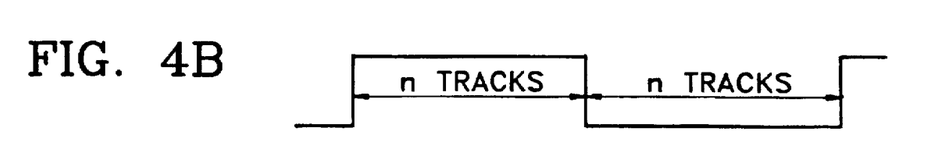
FIG. 4B illustrates a rectangular shaped hall effect signal corresponding to the tracking signal of FIG. 4A.

FIG. 4A illustrates the tracking error signal of FIG. 1 and FIG. 4B illustrates a regular wave shaped hall effect signal corresponding to the tracking error signal of FIG. 4A. As shown, the hall effect signal has a pulse cycle longer than the tracking error signal by several times to several tens of times. With the photo interrupt signal or the hall effect signal, a relatively accurate location control is possible even though a defect may exist on a pit of an optical disk. Since every pulse is counted at its inverting point, a counting error reaches half a cycle at the worst. An error of less than half a cycle matters little in a relatively short cycle, such as that of a tracking error signal. However, the error becomes a significant problem in a relatively long cycle, such as that of a photo interrupt signal or a hall effect signal. The worst case error of half a cycle occurring with the photo interrupt signal or the hall effect signal having a cycle longer than the tracking error signal by several tens of times causes several tens of tracks that must be jumped. As a result, the time required to compensate for the error increases.

Figure 5:
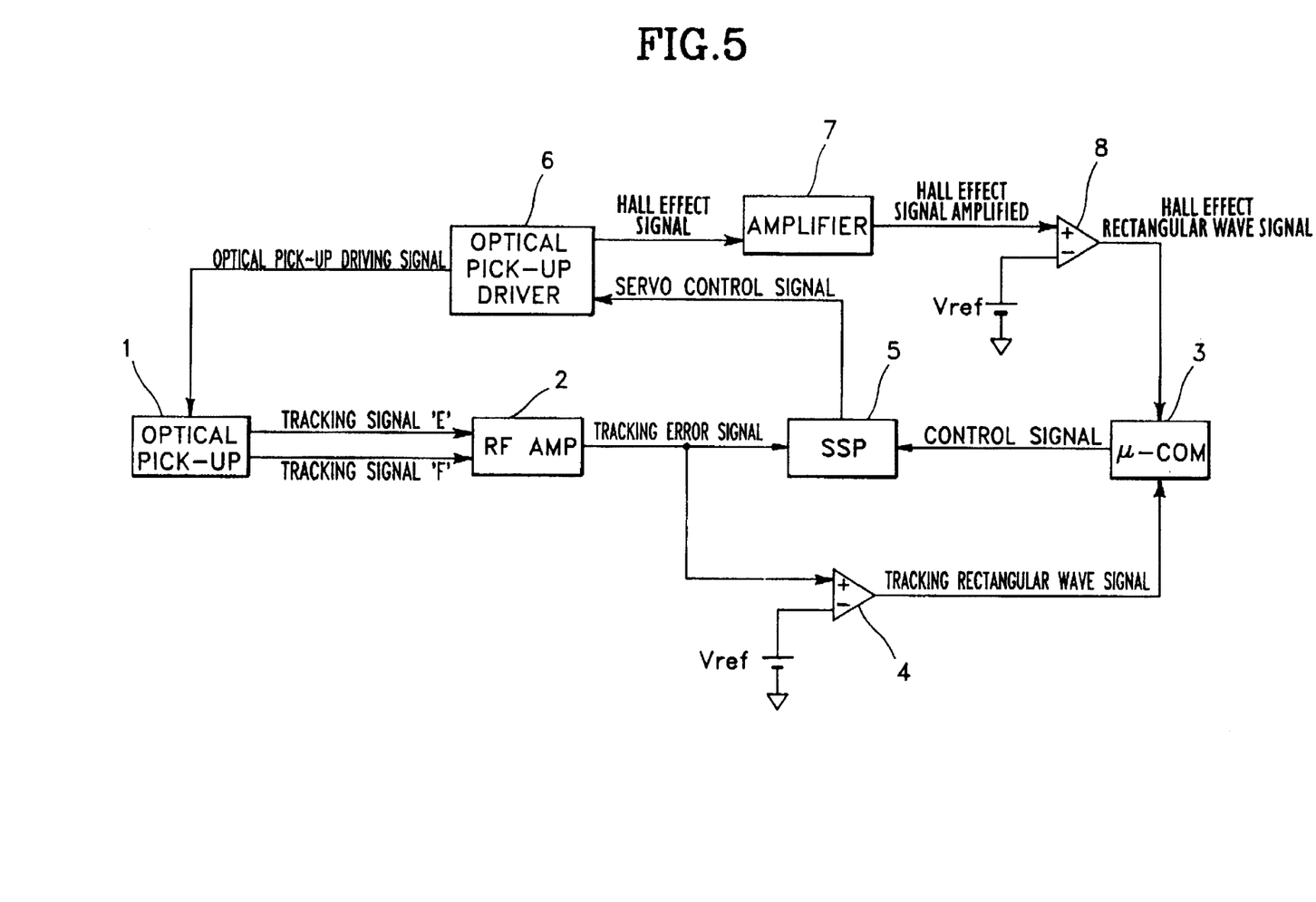
FIG. 5 is a block diagram of an optical disk system explaining a method and apparatus for controlling the moving distance of an optical pick-up according to the present invention.

FIG. 5 is a block diagram of an optical disk system explaining a method and apparatus for controlling the moving distance of an optical pick-up according to the present invention. The optical disk system of FIG. 5 is the same as that of FIG. 1, except that the system of FIG. 5 has an additional amplifier 7 for amplifying a photo interrupt signal or a hall effect signal output from the optical pick-up driver 6 and an additional comparator 8 for converting the amplified photo interrupt or hall effect signal into a rectangular wave signal and for outputting the rectangular wave signal to a microcomputer 3. The photo interrupt rectangular wave signal or the hall effect rectangular wave signal is counted in an event counter of the microprocessor 3.

Referring to FIG. 5, there is a sled motor (not shown) in the optical pick-up driver 6. The sled motor moves the optical pick-up 1 toward an inner or outer circumference of an optical disk. Accordingly, a sensor must be installed to count the number of rotations of the sled motor.

In the case that a photo sensor is installed in the sled motor, the photo sensor generates the photo interrupt signal in which the number of pulses is proportional to the number of rotations of the sled motor. Accordingly, the number of pulses of the photo interrupt signal from the photo sensor represents the moving distance of the optical pick-up. Actually, the photo interrupt signal has a sinusoidal waveform. Thus, an amplifier 7 and a comparator 8 are required to count the number of pulses.

In the case that a hall effect sensor is installed in the sled motor utilizing the hall effect, the hall effect sensor generates a hall effect signal in which the number of pulses is proportional to the number of rotations of the sled motor. Accordingly, the number of pulses of the hall effect signal from the hall effect sensor represents the moving distance of the optical pick-up. Actually, the hall effect signal has a sinusoidal waveform. Thus, an amplifier 7 and a comparator 8 are required to count the number of pulses.

Figure 6:
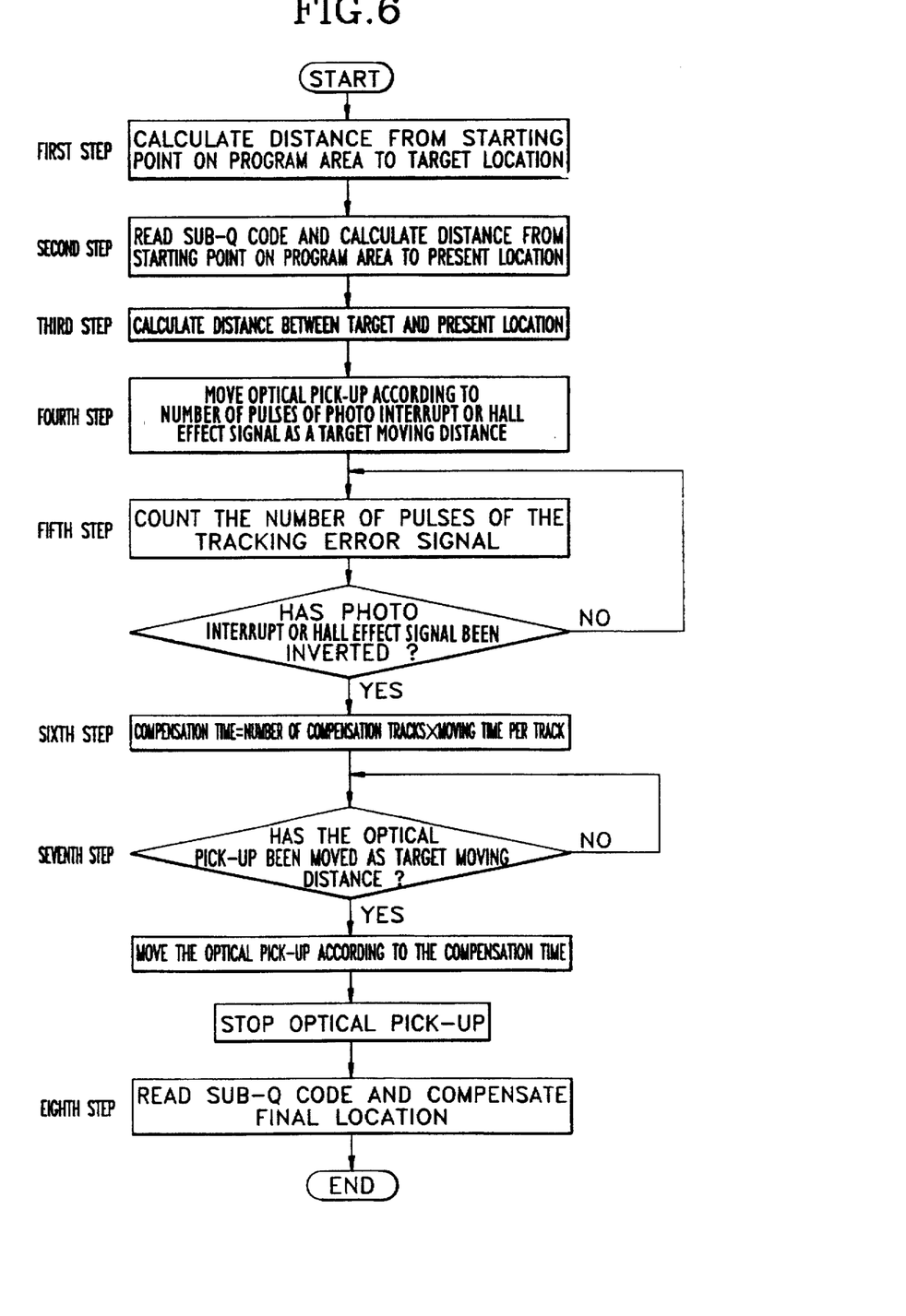
FIG. 6 is a flowchart explaining the method of controlling the optical pick-up according to the apparatus of FIG. 5.

FIG. 6 is a flowchart showing the method and apparatus of controlling the moving distance of the optical pick-up according to the apparatus of FIG. 5. The technique for controlling the moving distance of the optical pick-up according to an embodiment of the present invention will be described below referring to FIG. 6. A first count of the number of pulses of a tracking error signal generated during half a cycle of a photo interrupt signal or a hall effect signal is taken. Then, the distance from a starling point on a corresponding program area to a target location, i.e., a distance to a target location, is calculated in step 1. In step 2, a sub-Q code is read and the distance from the starting point on the corresponding program area to the current location of the optical pick-up, i.e., a distance to the current location, is calculated. In step 3, an aimed distance to move is obtained by subtracting the current location distance from the target location distance. In step 4, the optical pick-up is moved according to the number of pulses of the photo interrupt signal or the hall effect signal corresponding to the aimed distance to move. When the aimed distance to move is plus-signed, the optical pick-up is moved toward an inner circumference. In contrast, when the aimed distance to move is minus-signed, it is moved toward an outer circumference. In step 5, a second count of the number of pulses of the tracking error signal generated from a post-movement point to a first inverting point of the photo interrupt signal or the hall effect signal is taken. In step 6, the number of tracks to compensate for is obtained by subtracting the second number of pulses from the first number of pulses, and a compensation time is calculated by multiplying the number of tracks to compensate by a predetermined moving time per unit track. In step 7, when the optical pick-up is moved for the aimed distance to move completely, the optical pick-up is further moved in the same direction for the compensation time. When the additional movement is complete, a sub-Q code is read and a final location compensation is performed in step 8. If there are many remaining tracks to compensate for, a sled motor is controlled to move the optical pick-up, otherwise, a track jump is performed.

Figure 7A:
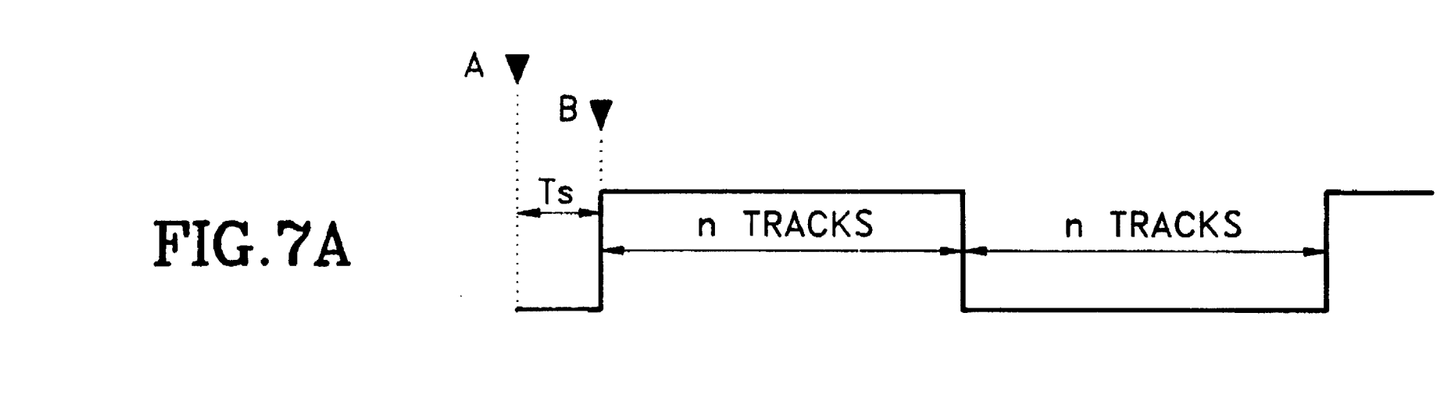
FIG. 7A illustrates the photo interrupt rectangular wave signal or the hall effect rectangular wave signal.
Figure 7B:
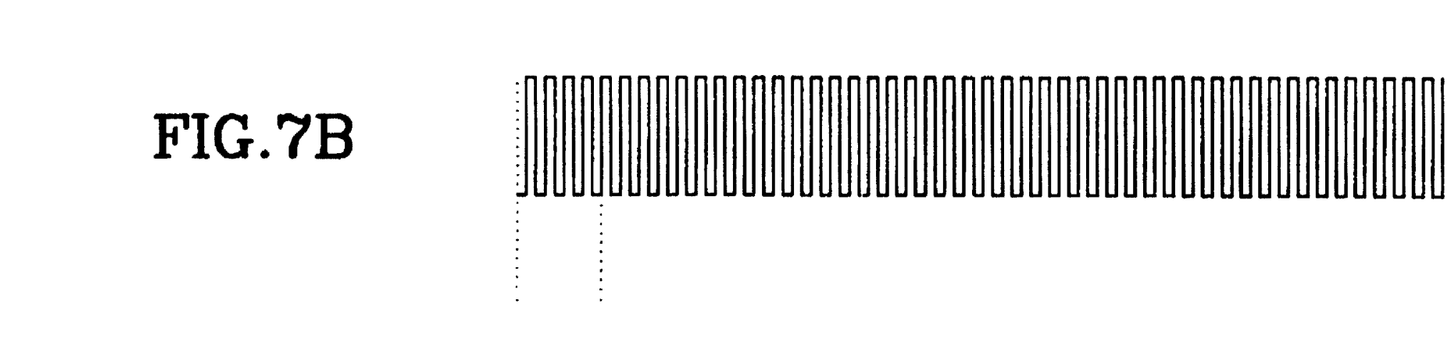
FIG. 7B is a timing diagram of a tracking error rectangular wave signal corresponding to the signal of FIG. 7A.

FIG. 7A illustrates the photo interrupt signal or the hall effect signal of FIG. 5. FIG. 7B is a timing diagram of a tracking error signal corresponding to FIG. 7A. Here, reference character A denotes a starting point for moving the optical pick-up, reference character B denotes a first inverting point of the photo interrupt signal or the hall effect signal, and reference character $T_s$ denotes the time required for the optical pick-up to move by the first inverting point of the photo interrupt signal or the hall effect signal. The event counter in the microprocessor denoted by reference numeral 3 in FIG. 5 considers $T_s$ as half a cycle of the photo interrupt signal or the hall effect signal. Therefore, assuming that half a cycle is T/2, a compensation time $T_c$ is $T/2-T_s$. Thus, a maximum counting error of half a cycle generated simultaneously with counting can be compensated for. Further, the error of the tracking error signal can be compensated for even with a defect in a pit on an optical disk by using the photo interrupt signal or the hall effect signal.

As described above, the method for controlling the moving distance of an optical pick-up can reduce the access time in an optical disk system by using a tracking error signal and a photo interrupt signal, or the tracking error signal and a hall effect signal.

The present invention is not restricted to the above embodiment, and it is clearly understood that many variations are possible within the scope and spirit of the present invention by anyone skilled in the art.

What is claimed is:

1. A method of controlling the moving distance of an optical pick-up in an optical disk system, comprising the steps of:

taking a first count of the number of pulses of a tracking error signal generated during half a cycle of a photo interrupt signal;

calculating an aimed distance to move by subtracting a current location of said optical pick-up from a target location thereof;

moving said optical pick-up according to the number of pulses of said photo interrupt signal indicating said aimed distance to move;

taking a second count of the number of pulses of said tracking error signal generated from a moving point to a first inverting point of said photo interrupt signal; and further moving said optical pick-up for the number of tracks to compensate for, the number being obtained by subtracting said second number of pulses from said first number of pulses.

2. A method of controlling the moving distance of an optical pick-up in an optical disk system as claimed in claim 1, wherein in said step of moving said optical pick-up, when said aimed distance to move has a negative value, moving said optical pick-up toward an inner circumference of an optical disk, and when said aimed distance to move is has a positive value, moving said optical pick-up toward an outer circumference.

3. A method of controlling the moving distance of an optical pick-up in an optical disk system as claimed in claim 1, wherein a pulse of said tracking error signal is in the form of a rectangular wave converted in a comparator.

4. A method of controlling the moving distance of an optical pick-up in an optical disk system as claimed in claim 1, after said step of further moving said optical pick-up, further comprising the step of finally compensating the location of said optical pick-up.

5. A method of controlling the moving distance of an optical pick-up in an optical disk system as claimed in claim 4, wherein a sled motor is controlled to move said optical pick-up in said step of finally compensating the location of said optical pick-up if there are relatively large number of remaining tracks to compensate for, and otherwise, a track jump is performed.

6. A method of controlling the moving distance of an optical pick-up in an optical disk system as claimed in claim 5, wherein said track jump performs said compensation by moving an object lens of said optical pick-up.

7. A method of controlling the moving distance of an optical pick-up in an optical disk system as claimed in claim 1, wherein said optical pick-up is further moved for a compensation time obtained by multiplying said number of tracks to compensate for by a predetermined moving time per unit track in said step of further moving said optical pick-up.

8. A method of controlling the moving distance of an optical pick-up in an optical disk system as claimed in claim 1, wherein said optical pick-up is moved in the direction in which said optical pick-up was moved in a previous step in said step of further moving said optical pick-up.

9. A method of controlling the moving distance of an optical pick-up in an optical disk system, comprising the steps of:

taking a first count of the number of pulses of a tracking error signal generated during half a cycle of a hall effect signal;

calculating an aimed distance to move by subtracting a current location of said optical pick-up from a target location thereof;

moving said optical pick-up according to the number of pulses of said hall effect signal indicating said aimed distance to move;

taking a second count of the number of pulses of said tracking error signal generated from a moving point to a first inverting point of said hall effect signal; and further moving said optical pick-up for the number of tracks to compensate for, the number being obtained by subtracting said second number of pulses from said first number of pulses.

10. A method of controlling the moving distance of an optical pick-up in an optical disk system as claimed in claim 9, wherein in said step of moving said optical pick-up, if said aimed distance to move is minus-signed, said optical pick-up is moved toward an inner circumference of an optical disk, and if said aimed distance to move is plus-signed, said optical pick-up is moved toward an outer circumference.

11. A method of controlling the moving distance of an optical pick-up in an optical disk system as claimed in claim 9, wherein a pulse of said tracking error signal is in the form of a rectangular wave convened in a comparator.

12. A method of controlling the moving distance of an optical pick-up in an optical disk system as claimed in claim 9, after said step of further moving said optical pick-up, further comprising the step of finally compensating the location of said optical pick-up.

13. A method of controlling the moving distance of an optical pick-up in an optical disk system as claimed in claim 12, wherein a sled motor is controlled to move said optical pick-up in said step of finally compensating the location of said optical pick-up if there are a relatively large number of remaining tracks to compensate for, and otherwise, a track jump is performed.

14. A method of controlling the moving distance of an optical pick-up in an optical disk system as claimed in claim 13, wherein said track jump performs said compensation by moving an object lens of said optical pick-up.

15. A method of controlling the moving distance of an optical pick-up in an optical disk system as claimed in claim 9, wherein said optical pick-up is further moved for a compensation time obtained by multiplying said number of tracks to compensate for by a predetermined moving time per unit track in said step of further moving said optical pick-up.

16. A method of controlling the moving distance of an optical pick-up in an optical disk system as claimed in claim 9, wherein said optical pick-up is moved in the direction in which said optical pick-up was moved in a previous step in said step of further moving said optical pick-up.

17. An apparatus for controlling the moving distance of an optical pick-up in an optical disk system, comprising:

a counter for taking a first count of the number of pulses of a tracking error signal generated during half a cycle of a photo interrupt signal;

a subtractor for calculating an aimed distance to move by subtracting a current location of said optical pick-up from a target location thereof;

moving means for moving said optical pick-up according to the number of pulses of said photo interrupt signal indicating said aimed distance to move;

another counter for taking a second count of the number of pulses of said tracking error signal generated from a moving point to a first inverting point of said photo interrupt signal; and said moving means further moving said optical pick-up for the number of tracks to compensate for, the number being obtained from another subtractor by subtracting said second number of pulses from said first number of pulses.

18. An apparatus for controlling the moving distance of an optical pick-up in an optical disk system as claimed in claim 17, wherein when said moving means moves said optical pick-up, if said aimed distance to move calculated by said subtractor is minus-signed, said optical pick-up is moved by said moving means toward an inner circumference of an optical disk, and if said aimed distance to move calculated by said subtractor is plus-signed, said optical pick-up is moved by said moving means toward an outer circumference.

19. An apparatus for controlling the moving distance of an optical pick-up in an optical disk system as claimed in claim 17, wherein a pulse of said tracking error signal is in the form of a rectangular wave convened in a comparator.

20. An apparatus for controlling the moving distance of an optical pick-up in an optical disk system as claimed in claim 17, after said moving means further moves said optical pick-up, further comprising a compensating means for finally compensating the location of said optical pick-up.

21. An apparatus for controlling the moving distance of an optical pick-up in an optical disk system as claimed in claim 20, further comprising a sled motor which is controlled to move said optical pick-up in finally compensating the location of said optical pick-up if there are relatively large number of remaining tracks to compensate for, and otherwise, a track jump is performed.

22. An apparatus for controlling the moving distance of an optical pick-up in an optical disk system as claimed in claim 21, further comprising another moving means, said track jump performing said compensation by said another moving means moving an object lens of said optical pick-up.

23. An apparatus for controlling the moving distance of an optical pick-up in an optical disk system as claimed in claim 17, further comprising a multiplier, said optical pick-up being further move it by said moving means for a compensation time obtained by multiplying in said multiplier said number of tracks to compensate for by a predetermined moving time per unit track in further moving said optical pick-up.

24. An apparatus for controlling the moving distance of an optical pick-up in an optical disk system as claimed in claim 17, said optical pick-up being moved by said moving means in the direction in which said optical pick-up was previously moved by said moving means in further moving said optical pick-up.

25. An apparatus for controlling the moving distance of an optical pick-up in an optical disk system, comprising:

a counter for taking a first count of the number of pulses of a tracking error signal generated during half a cycle of a hall effect signal;

a subtractor for calculating an aimed distance to move by subtracting a current location of said optical pick-up from a target location thereof;

moving means for moving said optical pick-up according to the number of pulses of said hall effect signal indicating said aimed distance to move;

another counter for taking a second count of the number of pulses of said tracking error signal generated from a moving point to a first inverting point of said hall effect signal; and said moving means further moving said optical pick-up for the number of tracks to compensate for, the number being obtained from another subtractor by subtracting said second number of pulses from said first number of pulses.

26. An apparatus controlling the moving distance of an optical pick-up in an optical disk system as claimed in claim 21, wherein when said moving means moves said optical pick-up, if said aimed distance to move calculated by said subtractor is minus-signed, said optical pick-up is moved by said moving means toward an inner circumference of an optical disk, and if said aimed distance to move calculated by said subtractor plus-signed, said optical pick-up is moved by said moving means toward an outer circumference.

27. An apparatus for controlling the moving distance of an optical pick-up in an optical disk system as claimed in claim 25, wherein a pulse of said tracking error signal is in the form of a rectangular wave convened in a comparator.

28. An apparatus for controlling the moving distance of an optical pick-up in an optical disk system as claimed in claim 25, after said moving means further moves said optical pick-up, further; comprising a compensating means for finally compensating the location of said optical pick-up.

29. An apparatus for controlling the moving distance of an optical pick-up in an optical disk system as claimed in claim 28, further comprising a sled motor which is controlled to move said optical pick-up in finally compensating the location of said optical pick-up if there are a relatively large number of remaining tracks to compensate for, and otherwise, a track jump is performed.

30. An apparatus for controlling the moving distance of an optical pick-up in an optical disk system as claimed in claim 29, further comprising another moving means, said track jump performing said compensation by said another moving means moving an object lens of said optical pick-up.

31. An apparatus for controlling the moving distance of an optical pick-up in an optical disk system as claimed in claim 25, further comprising a multiplier, said optical pick-up being further moved by said moving means for a compensation time obtained by multiplying in said moving means said number of tracks to compensate for by a predetermined moving time per unit track in said step of further moving said optical pick-up.

32. An apparatus for controlling the moving distance of an optical pick-up in an optical disk system as claimed in claim 25, said optical pick-up being moved by said moving means in the direction in which said optical pick-up was moved by said moving means in further moving said optical pick-up.

* * * * *